US009147419B2

(12) United States Patent
Oberg et al.

(10) Patent No.: US 9,147,419 B2
(45) Date of Patent: Sep. 29, 2015

(54) GENERATING POSITION ERROR SIGNAL BASED ON DATA TRACKS FOR MAGNETIC DATA STORAGE

(71) Applicant: Marvell World Trade Ltd., St. Michael (BB)

(72) Inventors: Mats Oberg, San Jose, CA (US); Gregory Burd, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/499,819

(22) Filed: Sep. 29, 2014

(65) Prior Publication Data
US 2015/0092289 A1    Apr. 2, 2015

Related U.S. Application Data

(60) Provisional application No. 61/884,555, filed on Sep. 30, 2013.

(51) Int. Cl.
*G11B 5/596* (2006.01)
*G11B 20/10* (2006.01)
*G11B 5/55* (2006.01)

(52) U.S. Cl.
CPC .......... *G11B 5/59622* (2013.01); *G11B 5/5547* (2013.01); *G11B 5/5965* (2013.01); *G11B 5/59611* (2013.01); *G11B 5/59627* (2013.01); *G11B 20/10305* (2013.01)

(58) Field of Classification Search
None
See application file for complete search history.

(56) References Cited

U.S. PATENT DOCUMENTS

| 4,575,775 | A | | 3/1986 | Albrecht |
| 5,001,579 | A | * | 3/1991 | Compton ................ 360/77.06 |
| 5,245,487 | A | | 9/1993 | Cunningham |
| 5,436,773 | A | | 7/1995 | Hanson |
| 6,104,562 | A | | 8/2000 | Ottesen et al. |
| 6,154,335 | A | | 11/2000 | Smith et al. |

(Continued)

FOREIGN PATENT DOCUMENTS

EP    2626858 A1    8/2013

OTHER PUBLICATIONS

Kikawada A et al.; Inter-track Interference Free Coding and Equalization; Dec. 1, 1997; Journal of Magnetism and Megnetic Materials; Elsevier Science Publishers; Amsterdam, NL; pp. 66-72.

(Continued)

*Primary Examiner* — Wayne Young
*Assistant Examiner* — James L Habermehl

(57) ABSTRACT

A hard disk drive circuit includes first and second inter-track interference detection modules. The first inter-track interference detection module is configured to generate a first measured inter-track interference value based on a first read signal from a first read sensor positioned over a magnetic medium. The second inter-track interference detection module is configured to generate a second measured inter-track interference value based on a second read signal from a second read sensor positioned over the magnetic medium. A position error signal generation module is configured to generate a position error signal based on the first measured inter-track interference value and the second measured inter-track interference value. An arm control module is configured to control rotation of an arm in response to the position error signal. The first read sensor and the second read sensor are located at a distal end of the arm.

22 Claims, 10 Drawing Sheets

(56) References Cited

U.S. PATENT DOCUMENTS

| | | | |
|---|---|---|---|
| 7,009,805 B2* | 3/2006 | Wong et al. | 360/77.06 |
| 7,233,453 B2 | 6/2007 | Harada et al. | |
| 8,139,301 B1 | 3/2012 | Li et al. | |
| 8,300,339 B1* | 10/2012 | Nangare et al. | 360/39 |
| 8,537,482 B1 | 9/2013 | Song et al. | |
| 8,599,508 B1* | 12/2013 | Burd | 360/75 |
| 8,638,513 B1* | 1/2014 | Burd | 360/39 |
| 8,649,120 B1 | 2/2014 | Song et al. | |
| 8,665,543 B2* | 3/2014 | Bellorado et al. | 360/45 |
| 8,693,118 B1 | 4/2014 | Madden et al. | |
| 8,773,806 B2* | 7/2014 | Springberg et al. | 360/75 |
| 8,861,114 B1* | 10/2014 | Burd | 360/45 |
| 8,861,122 B1* | 10/2014 | Hwang et al. | 360/77.06 |
| 8,879,193 B1* | 11/2014 | Burd | 360/64 |
| 8,891,207 B1 | 11/2014 | Li et al. | |
| 8,913,341 B1* | 12/2014 | Jury et al. | 360/75 |
| 8,929,019 B2* | 1/2015 | Tagami et al. | 360/75 |
| 2003/0007276 A1 | 1/2003 | Satoh | |
| 2007/0201160 A1 | 8/2007 | Albrecht et al. | |
| 2009/0040643 A1 | 2/2009 | Weng et al. | |
| 2014/0029133 A1* | 1/2014 | Tagami et al. | 360/75 |

OTHER PUBLICATIONS

Lianna He et al.; A Novel Data Servo Method; IEEE Transactions on Magnetics; IEEE Service Center; New York, NY, US; vol. 32, No. 5; Sep. 1, 1996; pp. 3896-3898.

International Search Report and Written Opinion for PCT Application No. PCT/US2014/058116 dated Feb. 3, 2015.

* cited by examiner

GENERATING POSITION ERROR SIGNAL BASED ON DATA TRACKS FOR MAGNETIC DATA STORAGE

CROSS-REFERENCE TO RELATED APPLICATIONS

This application claims the benefit of U.S. Provisional Application No. 61/884,555, filed on Sep. 30, 2013. The entire disclosure of this application is incorporated herein by reference.

FIELD

The present disclosure relates to magnetic recording systems, and more particularly to inter-track interference cancellation in magnetic recording channels.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In FIG. 1, a hard disk drive (HDD) system 10 includes a hard disk assembly (HDA) 12 and an HDD printed circuit board (PCB) 14. The HDA 12 includes one or more circular platters (i.e., disks) 16, which have magnetic surfaces that are used to store data magnetically. The platters 16 are arranged in a stack, and the stack is rotated by a spindle motor 18. At least one read/write head assembly (hereinafter, "head") 20 reads data from and writes data on the magnetic surfaces of the platters 16 in various implementations.

The head 20 includes a write head portion (or, "write head"), such as an inductor, that generates a magnetic field and a read head portion (or, "read head"), such as a magneto-resistive (MR) element, that senses the magnetic field on the platters 16. The head 20 is mounted at a distal end of an actuator arm 22. An actuator, such as a voice coil motor (VCM) 24, moves the actuator arm 22 relative to the platters 16.

The HDA 12 includes a preamplifier 26 that amplifies signals received from and sent to the head 20. The preamplifier 26 generates a write current that flows through the write head of the head 20 when writing data. The write current is used to produce a magnetic field on the magnetic surfaces of the platters 16. Magnetic surfaces of the platters 16 induce low-level analog signals in the read head of the head 20 during reading of the platters 16. The preamplifier 26 amplifies the low-level analog signals and outputs amplified analog signals to a read/write channel module 28.

The HDD PCB 14 includes the read/write channel module 28, a hard disk control (HDC) module 30, a processor 32, a spindle/VCM driver module 34, volatile memory 36, nonvolatile memory 38, and an input/output (I/O) interface 40.

During write operations, the read/write channel module 28 may encode the data to increase reliability by using error-correcting codes (ECC) such as a run length limited (RLL) code, a Reed-Solomon code, etc. The read/write channel module 28 then transmits the encoded data to the preamplifier 26. During read operations, the read/write channel module 28 receives analog signals from the preamplifier 26. The read/write channel module 28 converts the analog signals into digital signals, which are decoded to recover the original data.

The HDC module 30 controls operation of the HDD system 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device 41, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the head 20 over the platters 16 during read/write operations. Servo, which is stored on the platters 16, ensures that data is written to and read from correct locations on the platters 16. HDDs generate position feedback signals from special magnetic patterns called servo patterns that are written in designated areas on the disk surface known as servo sectors. The servo may be written as part of the manufacturing process and then never subsequently modified. The position feedback signals are called position error signals (PES). The closed-loop servomechanism decodes the position information written in these sectors to position the head at a desired position relative to the track being read.

In FIG. 2, the HDD system 10 stores data on each of the platters 16 in concentric tracks, which are divided into sectors. The head 20 flies over the platters 16 and senses a magnetic field stored on the disk positioned over a certain track.

In FIG. 3, a receiver 90 includes an analog front end (AFE) module 100, an equalizer module 104, a detector module 108, and a back end module 112. A continuous-time signal is read from the disk and is processed by the AFE module 100. The AFE module 100 conditions and samples the continuous-time signal and outputs a discrete-time signal. The equalizer module 104 receives an output of the AFE module 100 and performs equalization to a predetermined target. A detector module 108 receives an output of the equalizer module and decodes data. For example only, the detector module 108 may include a sequence detector such as a Viterbi detector. An output of the detector module 108 is used to control the equalizer module 104 and control adaptation of the AFE module 100. Components of the receiver 90 up to and including the detector module 108 are identified in FIG. 3 as a front-end section 114 and components after the detector module 108 are identified in FIG. 3 as a back-end section 116.

A user data portion of the output of the equalizer module 104 is further processed by the back end module 112. The back end module 112 may perform more sophisticated detection and decoding for the purpose of error correction.

The AFE module 100 performs automatic gain control (AGC) to adjust gain. The equalizer module 104 may also be adaptive. Adaptation in the AFE module 100 and the equalizer module 104 typically use minimum mean square error (MMSE) criteria. Typically, an amplitude of the output of the equalizer module 104 changes with a single-to-noise ratio (SNR) of the system.

For a given track, channel SNR can change from one sector to another sector due to variations in the signal or in the noise. For instance, the SNR changes with read head fly height (i.e., distance between head and platter). The SNR also changes with the amount of inter-track interference (ITI). While the AGC in the AFE module 100 and the equalizer module 104 are optimal or near optimal for the detector module 108, the output of the equalizer module 104 may not be the optimal for the back end section 116.

In FIG. 4A, for each data sector, preamble (PRE), sync-mark (SM), user data (USERDATA) and post-amble (POST) fields are written on the disk. Two sectors are written on neighboring tracks from FIG. 2 and are identified as track n and track n+1. Typically, sectors on adjacent tracks are closely aligned. As the recording density increases, the distance between two neighboring tracks may decrease. When reading track n, the read head may also pick up a signal from one or more neighboring tracks—for example, track n+1. This phenomenon is called inter-track interference (ITI). The overall read-back signal may be modeled as the weighted sum of track n and track n+1 as set forth below:

$$r_n = (1-\alpha)y_n + \alpha y_{n+1}$$

where $r_n$ is the read-back signal, $y_n$ is the signal from track n, $y_{n+1}$ is the signal from track n+1, and $\alpha$ is an off-track percentage factor.

In FIG. 4B, a receiver 120 with inter-track interference cancellation is shown. The inter-track interference cancellation may be applied as a post processing step. The receiver 120 includes an analog front end (AFE) module 122, an equalizer module 124, a detector module 128, an inter-track interference cancellation module 130 and a back end module 132. A front end section 134 includes the AFE module 122, the equalizer module 124, and the detector module 128. A post processing section 136 includes the inter-track interference cancellation module 130. A back end section 138 includes the back end module 132. The inter-track interference cancellation module 130 treats inter-track interference as noise introduced in the front end section 134.

SUMMARY

A hard disk drive circuit includes first and second inter-track interference detection modules. The first inter-track interference detection module is configured to generate a first measured inter-track interference value based on a first read signal from a first read sensor positioned over a magnetic medium. The second inter-track interference detection module is configured to generate a second measured inter-track interference value based on a second read signal from a second read sensor positioned over the magnetic medium. A position error signal generation module is configured to generate a position error signal based on the first measured inter-track interference value and the second measured inter-track interference value. An arm control module is configured to control rotation of an arm in response to the position error signal. The first read sensor and the second read sensor are located at a distal end of the arm.

In other features, a hard disk drive system includes the hard disk drive circuit and a hard disk assembly including a read head. The read head includes the first read sensor and the second read sensor. In other features, the first inter-track interference detection module is configured to generate the first measured inter-track interference value while the first read sensor is positioned over first preamble data. In other features, the second inter-track interference detection module is configured to generate the second measured inter-track interference value while the second read sensor is positioned over second preamble data.

In other features, the position error signal generation module is configured to generate the position error signal based on (i) a first difference between the first measured inter-track interference value and a first target inter-track interference value and (ii) a second difference between the second measured inter-track interference value and a second target inter-track interference value. In other features, the hard disk drive circuit includes an offset calibration module configured to specify an offset between the first read sensor and the second read sensor in response to a number. The number identifies which track of the magnetic medium is being read by the hard disk drive circuit.

In other features, the hard disk drive circuit includes an inter-track interference cancellation module configured to generate a read signal based on the first read signal and the second read signal. In other features, the hard disk drive circuit includes a third inter-track interference detection module configured to generate a third measured inter-track interference value based on a third read signal from a third read sensor positioned over the magnetic medium. The position error signal generation module is configured to generate the position error signal based on the first measured inter-track interference value, the second measured inter-track interference value, and the third measured inter-track interference value.

A method of operating a hard disk drive circuit includes generating a first measured inter-track interference value based on a first read signal from a first read sensor positioned over a magnetic medium and generating a second measured inter-track interference value based on a second read signal from a second read sensor positioned over the magnetic medium. The method further includes generating a position error signal based on the first measured inter-track interference value and the second measured inter-track interference value. The method further includes controlling rotation of an arm in response to the position error signal. The first read sensor and the second read sensor are located at a distal end of the arm.

In other features, the generating the first measured inter-track interference value is performed while the first read sensor is positioned over first preamble data. In other features, the generating the second measured inter-track interference value is performed while the second read sensor is positioned over second preamble data. In other features, the position error signal is generated based on (i) a first difference between the first measured inter-track interference value and a first target inter-track interference value and (ii) a second difference between the second measured inter-track interference value and a second target inter-track interference value.

In other features, the method further includes specifying an offset between the first read sensor and the second read sensor in response to a number. The number identifies which track of the magnetic medium is being read by the hard disk drive circuit. In other features, the method further includes generating a read signal based on the first read signal and the second read signal by using inter-track interference cancellation. In other features, the method further includes generating a third measured inter-track interference value based on a third read signal from a third read sensor positioned over the magnetic medium. The position error signal is generated based on the first measured inter-track interference value, the second measured inter-track interference value, and the third measured inter-track interference value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

As aerial densities continue to increase for magnetic data storage, track pitch (also known as width) decreases as well. It is therefore increasingly difficult for a servo control loop to keep a read head properly located on a single track during read and write operations. With decreased track pitch, the read signal from a data track has more distortion contributed by data written to neighboring tracks. This is known as inter-track interference.

To more effectively combat inter-track interference, two or more read sensors may be used on a single head assembly. The multiple read sensors may provide signals that allow for the cancellation of inter-track interference components and/or the amplification of the desired read signal without amplifying the undesired inter-track interference.

While the platters are rotating, the amount of inter-track interference as the read head follows a track may indicate the position of the read head relative to the data track. The amount of inter-track interference may indicate how far off from the desired position the read head is and a corresponding position error signal can be generated. The position error signal can be used in the servo control loop to adjust the head (such as using a voice coil motor, as described above).

The position error signal may allow the track to be followed more accurately in between servo wedges. In addition or alternatively, the servo wedges may be included less frequently, thereby allowing more room for user data. In fact, if data is written to the tracks to allow a method according to the present disclosure to generate the position error signal, servo wedges may be eliminated altogether or there may be a single servo wedge on the platters.

Additional information regarding inter-track interference can be found in U.S. Pat. No. 8,537,482, issued Sep. 17, 2013, U.S. Pat. No. 8,649,120, issued Feb. 11, 2014, and U.S. Pat. No. 8,693,118, issued Apr. 8, 2014, the entire disclosures of which are hereby incorporated by reference.

Figure 1:
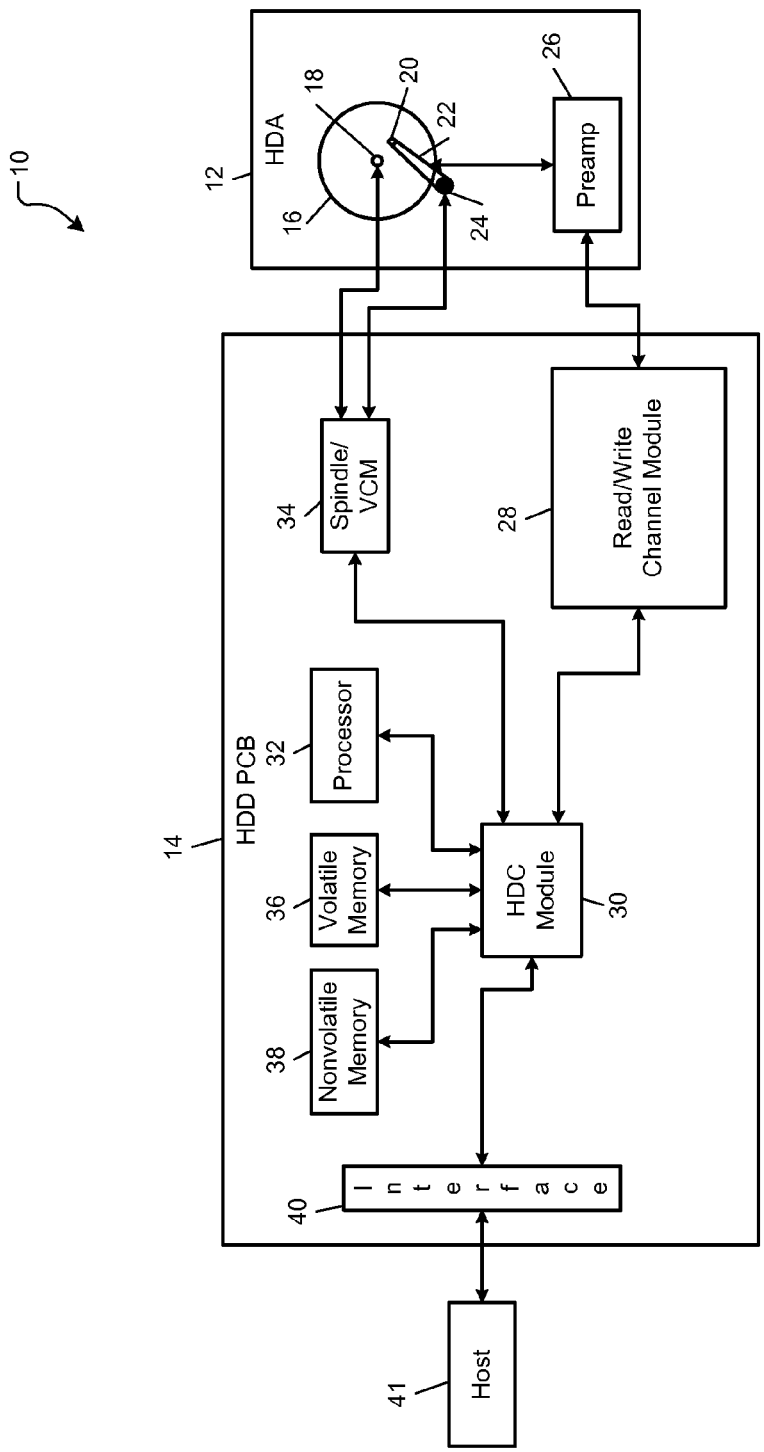
FIG. 1 is a functional block diagram of a hard disk drive according to the prior art.
Figure 2:
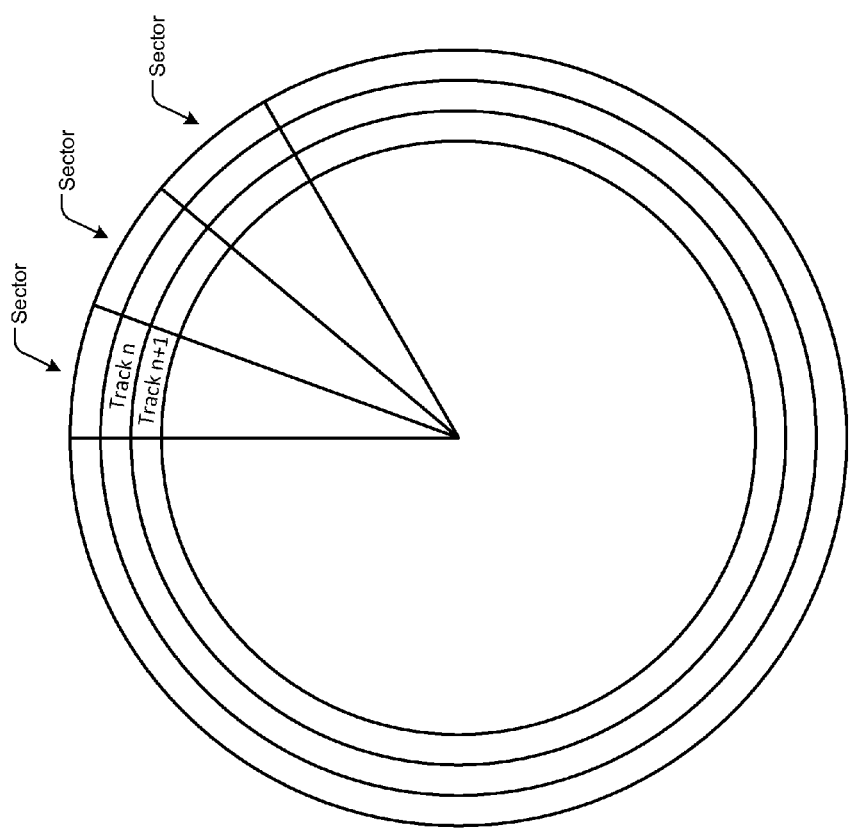
FIG. 2 illustrates tracks and sectors on a disk of a hard disk drive according to the prior art.
Figure 3:
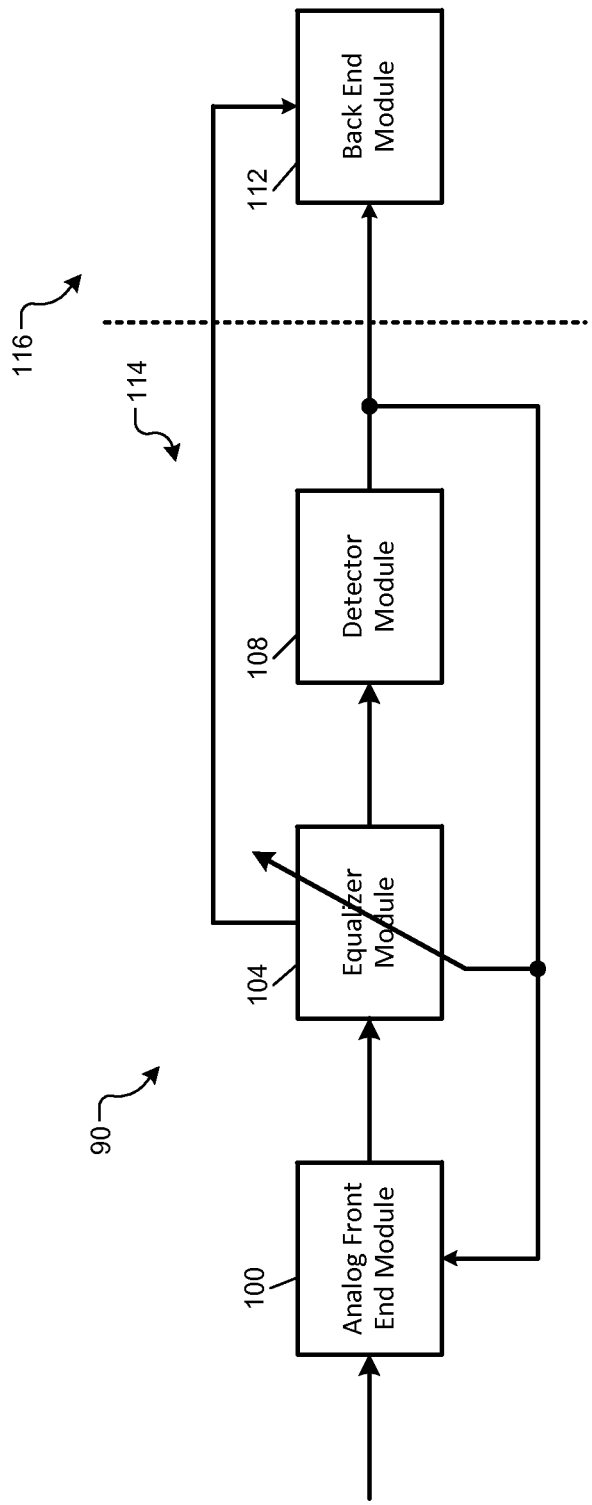
FIG. 3 is a functional block diagram of an example read channel according to the prior art.
Figures 4A, 4B:
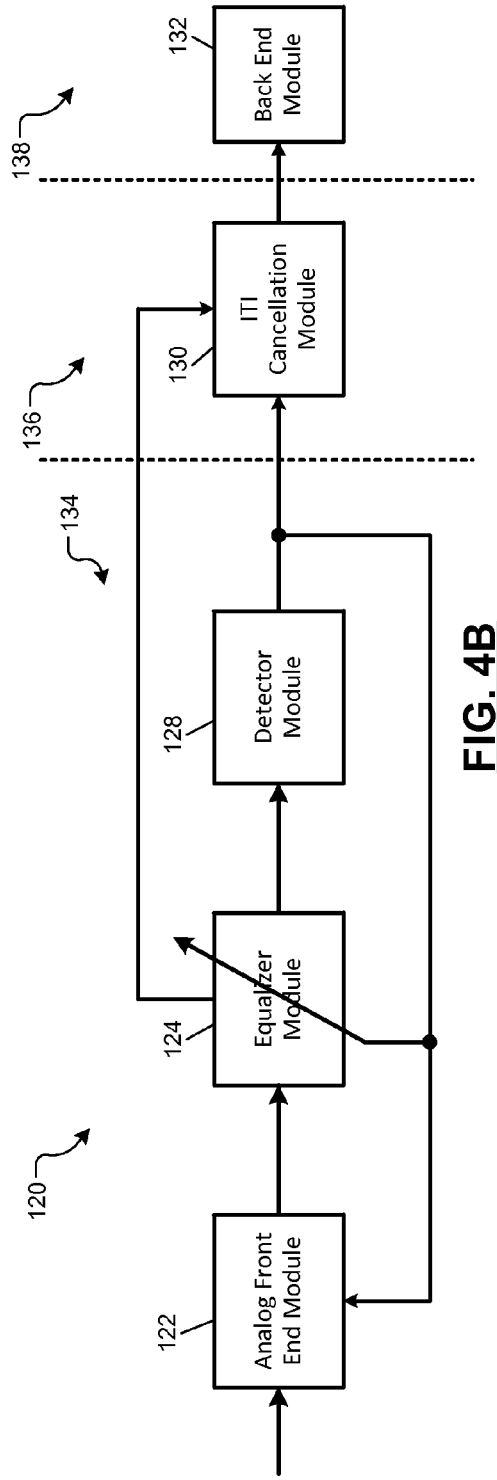
FIG. 4A is a visual representation of portions of data stored on two adjacent tracks according to the prior art.
FIG. 4B is a functional block diagram of a read channel, including inter-track interference cancellation, according to the prior art.
Figure 5:
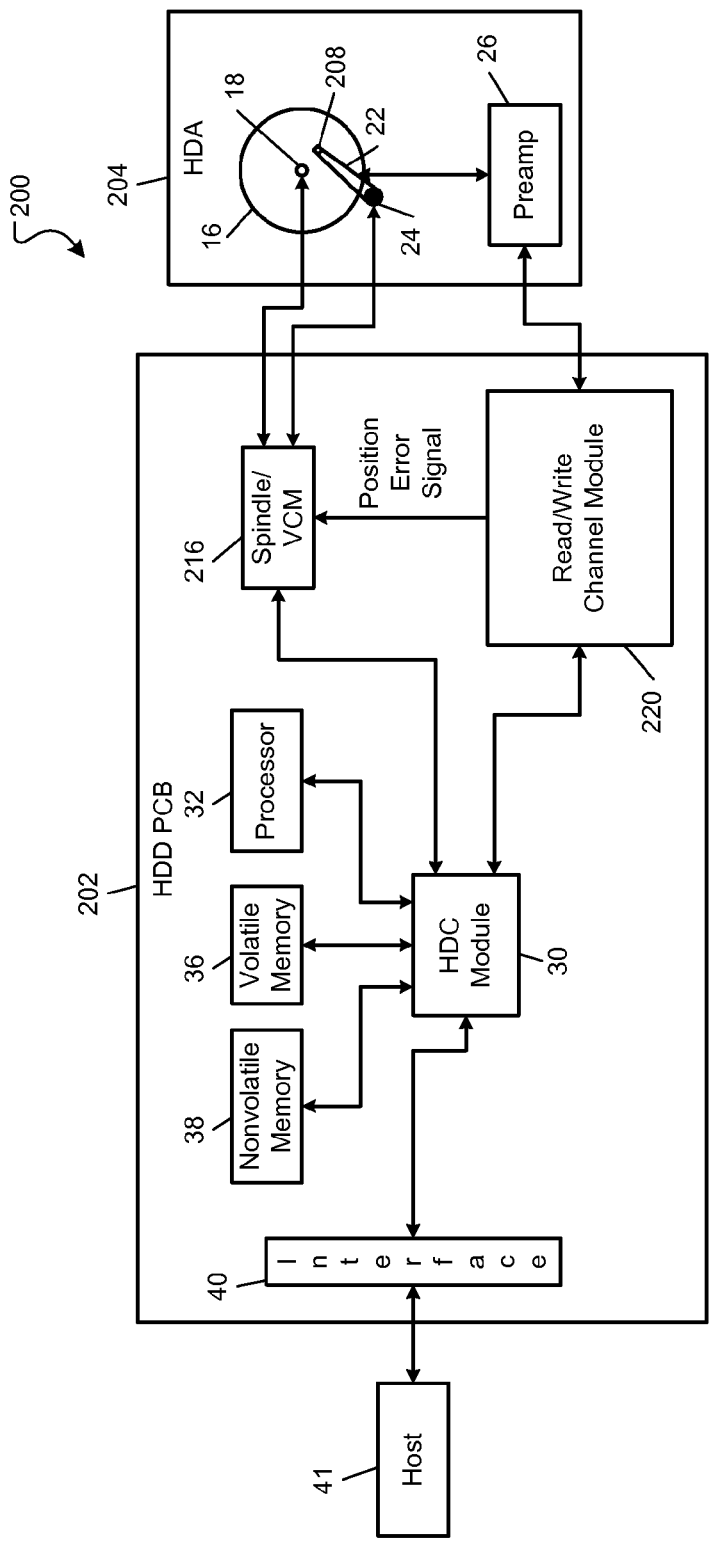
FIG. 5 is a functional block diagram of an example hard drive system according to the principles of the present disclosure.

In FIG. 5, a hard disk drive (HDD) system 200 includes an HDD printed circuit board (PCB) 202 and a hard drive assembly (HDA) 204. Reference numerals from FIG. 1 are used to indicate similar elements. A head 208 (also called a head assembly) includes one or more read sensors as described in more detail below. A spindle/VCM (voice coil motor) driver module 216 controls an angle of the actuator arm 22 using the VCM 24. The angle controls the position of the head 208 over the platters 16 of the hard drive assembly 204.

A read/write channel module 220 communicates with the hard drive controller (HDC) module 30 and the pre-amp 26. The read/write channel module 220 may generate a position error signal that is provided to the spindle/VCM driver module 216 for controlling the angle of the actuator arm 22. The read/write channel module 220 may generate the position error signal based on a measurement of inter-track interference.

Figure 6A:
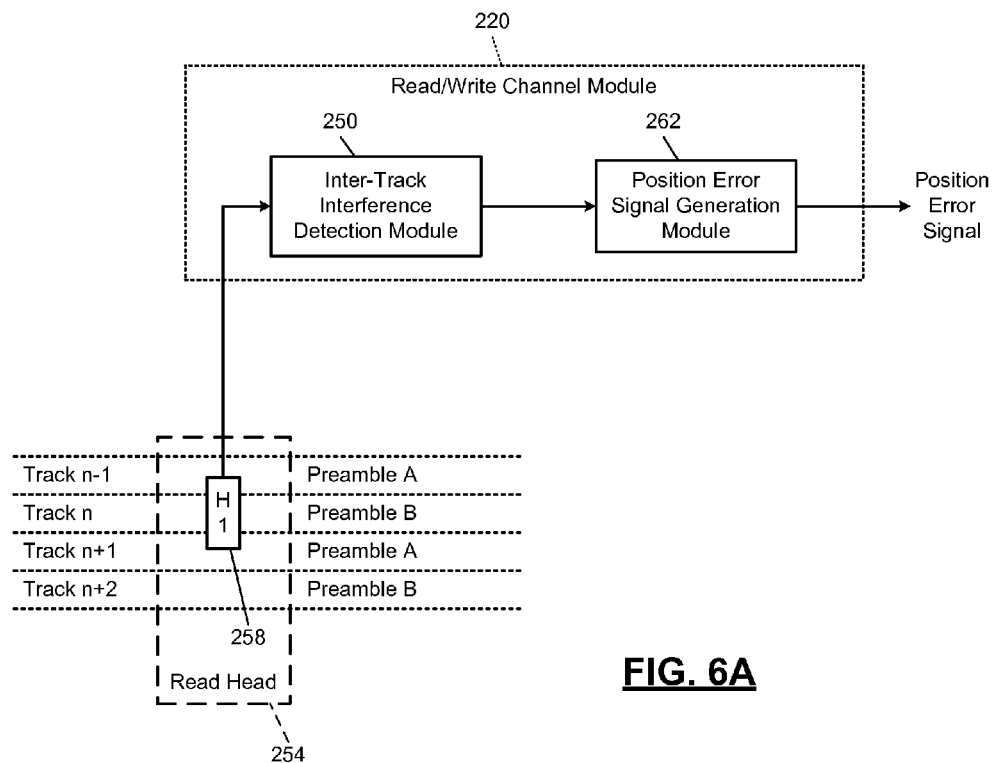
FIG. 6A is a partial functional block diagram of a read system.

In FIG. 6A, an example implementation of the read/write channel module 220 is shown with components that implement some of the functionality of the read/write channel module 220. An inter-track interference detection module 250 receives signals from a read head 254. The signals may be processed by one or more components, such as a preamp (not shown in FIG. 6A).

The read head 254 includes a read sensor 258 that senses data on a certain track—track n in the example of FIG. 6A. The inter-track interference detection module 250 may calculate an amount of inter-track interference, such as from track n−1 and track n+1, and provide a measured value of the inter-track interference to a position error signal generation module 262.

The position error signal generation module 262 may be preprogrammed with an expected (or, target) level of inter-track interference. The preprogrammed level of inter-track interference is compared with the measured inter-track interference by the inter-track interference detection module 250. When the measured inter-track interference differs from the preprogrammed inter-track interference, the position error signal generation module 262 determines that the read sensor 258 is no longer positioned at the correct location with respect to track n.

As described below in FIGS. 8 and 9, the position error signal generation module 262 determines a direction that the read sensor 258 should move to correct its positioning, and generates a position error signal accordingly. As shown in FIG. 5, the position error signal is provided to the spindle/VCM driver module 216 to adjust the angle of the actuator arm 22.

The preprogrammed inter-track interference value in the position error signal generation module 262 may be determined at a time of manufacturing, such as during an initial calibration process. In various other implementations, the preprogrammed inter-track interference may be determined at design time, and may therefore be hardcoded into the position error signal generation module 262.

In various implementations, the position error signal generation module 262 may adjust the preprogrammed inter-track interference, such as based on servo data. For example, if servo data has indicated that the read sensor is correctly positioned but immediately subsequent inter-track interference data differs from the preprogrammed inter-track interference, the preprogrammed inter-track interference may be adjusted.

However, biases and inaccuracies in the servo control loop may lead to data being written slightly offset from where the servo data would indicate. As a result, by measuring inter-track interference, which is based on the actual location of the written data, the written data may be tracked more accurately than when relying just on the servo data.

The inter-track interference detection module 250 may determine the amount of inter-track interference by determining the energy contributed by track n versus the energy contributed by tracks n−1 and n+1. The percentage of the total energy that is contributed not by track n but by other tracks may be designated as the inter-track interference value. Energy from each of the tracks may be determined using, for example, a discrete Fourier transform (DFT). In various implementations, inter-track interference values may be determined while the read sensor 258 is located over preamble data. Preamble data, in various implementations, is fixed and therefore know a priori. For example, the frequency data from the DFT may be filtered according to the known frequency components in each preamble. Once the frequency-domain information corresponding to one of the preambles is extracted, an energy function (such as a peak detect or a sum of squares) can be used to determine the energy corresponding to the preamble.

Preambles on adjacent tracks may be orthogonal to each other thereby allowing the inter-track interference detection module 250 to determine the contribution from one track versus an adjacent track. For example, preambles designated as 2T, 3T, and 5T (a 2T preamble in this context means a bit sequence of two zeroes followed by two ones followed by two zeroes, etc.) may be orthogonal.

Figure 6B:
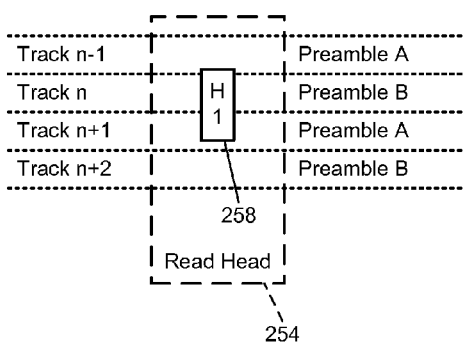
FIGS. 6B-6C are additional examples of orientation of a read head and orthogonality of preambles.

For example only, see FIG. 6B where track n uses Preamble B while track n−1 and track n+1 use Preamble A. Preambles A and B are fixed sequences of data that are orthogonal to each other and therefore can be differentiated by the inter-track interference detection module 250. Because the read sensor 258 is centered over the track, when the contribution from track n−1 or track n+1 increases, the determined inter-track interference will increase because the dominance of the desired track, track n, will decrease.

The increased inter-track interference indicates that the read sensor 258 is drifting from the desired location with respect to the track. However, the direction of the drift may not be definitively measured. As described in more detail below in FIG. 8, the position error signal generation module 262 may therefore move the read sensor 258 in one direction and see if the inter-track interference improves (generally, decreases); and if not, the read sensor 258 is moved in the other direction.

Figure 6C:
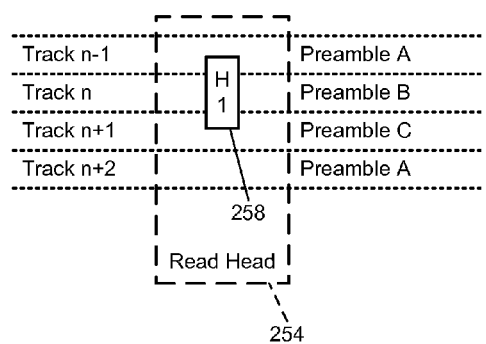

In FIG. 6C, the read sensor 258 is shown in an offset position—that is, not centered on track n. If the offset position is the target position of the read sensor 258, the measured inter-track interference will be slightly higher than if the read sensor 258 were centered on track n because the contribution from track n+1 will be more significant. Therefore, the preprogrammed inter-track interference in the position error signal generation module 262 may be set to a higher value.

If the measured inter-track interference decreases, that indicates that the read sensor 258 is moving up (using the orientation on the page of FIG. 6C), leading to a decrease in the contribution of track n+1 and an increase in the contribution of track n. Meanwhile, if the inter-track interference increases, that is an indication that the read sensor 258 has drifted down, causing the contribution of track n+1 to increase.

Note that in FIG. 6C, as the read sensor 258 moves up, the contribution from track n increases. The increase is due to the response of the read sensor 258 not being linear across the entire length of the read sensor 258. In other words, the ends of the read sensor 258 are less sensitive than the center of the read sensor 258. Therefore as the read sensor 258 becomes more centered over track n, the contribution of track n to the measured signal increases.

Another approach to determining the direction of drift of the read sensor 258 is to use three mutually-orthogonal preamble sequences referred to as Preamble A, Preamble B, and Preamble C. In this implementation, the inter-track interference detection module 250 may provide multiple inter-track interference measurements to the position error signal generation module 262. One measurement may indicate the amount of inter-track interference from track n−1 and the other measurement may indicate the amount of inter-track interference from track n+1. The multiple measurements, corresponding to different drift directions, allow the position error signal generation module 262 to determine in which direction the read sensor 258 is drifting.

Figure 7A:
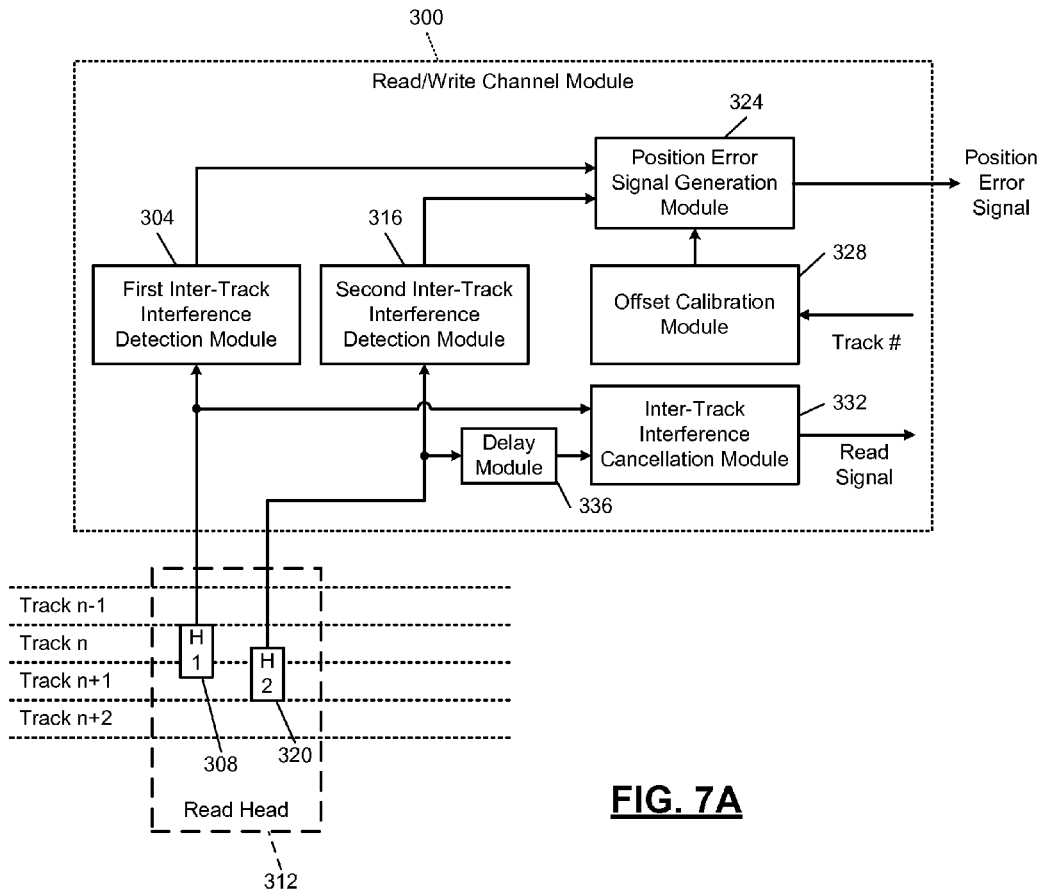
FIG. 7A is a partial functional block diagram of an example read path of a hard drive system.

In FIG. 7A, another example implementation of a read/write channel module 300 is shown. A first inter-track interference detection module 304 receives a signal from a first read sensor 308 of a read head 312. A second inter-track interference detection module 316 receives a read signal from a second read sensor 320 of the read head 312. In various implementations, the read head 312 may include one or more additional read sensors (not shown), which may correspond to additional inter-track interference detection modules (not shown) in the read/write channel module 300.

The first inter-track interference detection module 304 determines the amount of inter-track interference experienced by the first read sensor 308 and provides that value to a position error signal generation module 324. The second inter-track interference detection module 316 determines an amount of inter-track interference experienced by the second read sensor 320 and provides that value to the position error signal generation module 324. In various implementations, the first and second inter-track interference detection modules 316 and 324 may each have filters matched to the various preambles—for example, for a given preamble, the filter may be a bandpass filter having a pass band centered around a peak energy frequency of the preamble.

The position error signal generation module 324 determines a magnitude of a position error signal based on how much the inter-track interference values from the first inter-track interference detection module 304 and the second inter-track interference detection module 316 differ from preprogrammed target values. A sign of the position error signal is set based on the direction of the drift of the read head 312 from the desired location over the track.

For example only, a positive sign for the position error signal may be used to indicate that the read head 312 has drifted toward track n+1, while a negative sign for the position error signal may indicate that the read head 312 has drifted toward track n−1. A position error signal of zero may indicate that the position of the read head 312 does not need to be adjusted. An offset calibration module 328 indicates to the position error signal generation module 324 parameters about the offset between the read sensors 308 and 320 and/or between each of the read sensors 308 and 320 and a reference location (such as the center) of the track being read.

Figure 7B:
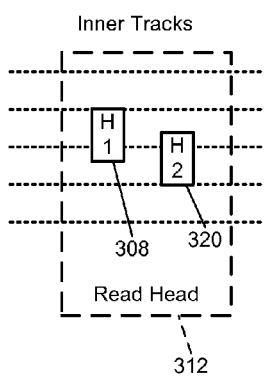
FIGS. 7B-7D are graphical illustrations of offsets between read sensors at different tracks on the hard drive platters.

For example only, see FIG. 7B where the read sensors 308 and 320 are offset as shown in FIG. 7A. The depicted offset of FIG. 7B may be the offset between the read sensors 308 and 320 for inner tracks of the platter—that is, for tracks near the center of the platter. As the actuator arm 22 rotates across the platter, the angle of the read head 312 changes with respect to the tracks, and therefore the offset between the sensors 308 and 320 with respect to the tracks also changes.

Figure 7C:
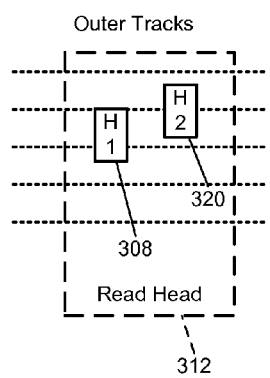
Figure 7D:
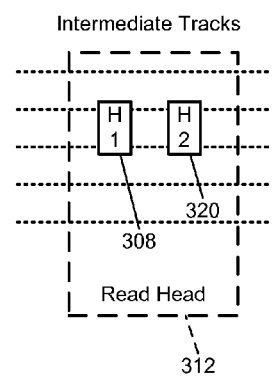

In FIG. 7C, outer tracks of the platter may have a different offset between the read sensors 308 and 320. For purposes of illustration only, an exaggerated change is shown in which the read sensor 320 is now located above the read sensor 308. In FIG. 7D, intermediate tracks, such as those equidistant between the inner and outer tracks, may have an offset between the read sensor 308 and the read sensor 320 of approximately zero.

Referring back to FIG. 7A, the offset calibration module 328 determines the expected offset between the read sensors 308 and 320 based on the track number, and provides that information to the position error signal generation module 324. These offsets may be stored in a table indexed by track number, or may be calculated according to an equation depending on track number.

The offset relationship may be determined at the time of manufacturing based on how the read sensors 308 and 320 are placed on the read head 312 during the manufacturing process. For example only, an equation based on the track number may include one or more constants that are set during a calibration portion of the manufacturing process.

An inter-track interference calibration module 332 receives the read signals from the read sensors 308 and 320, and generates a read signal by cancelling out contributions from tracks other than track n, the track being read. In various implementations, one of the read sensors 308 and 320 may encounter each bit of data prior to the other of the read sensors 308 and 320. Therefore, a delay may be imposed on one of the read signals to align the data received from each of the read sensors 308 and 320. For example only, if the read head 312 were moving from left to right along track n, a delay module 336 delays the signals from the second read sensor 320 to create time-alignment with the signals from the first read sensor 308.

Figure 8:
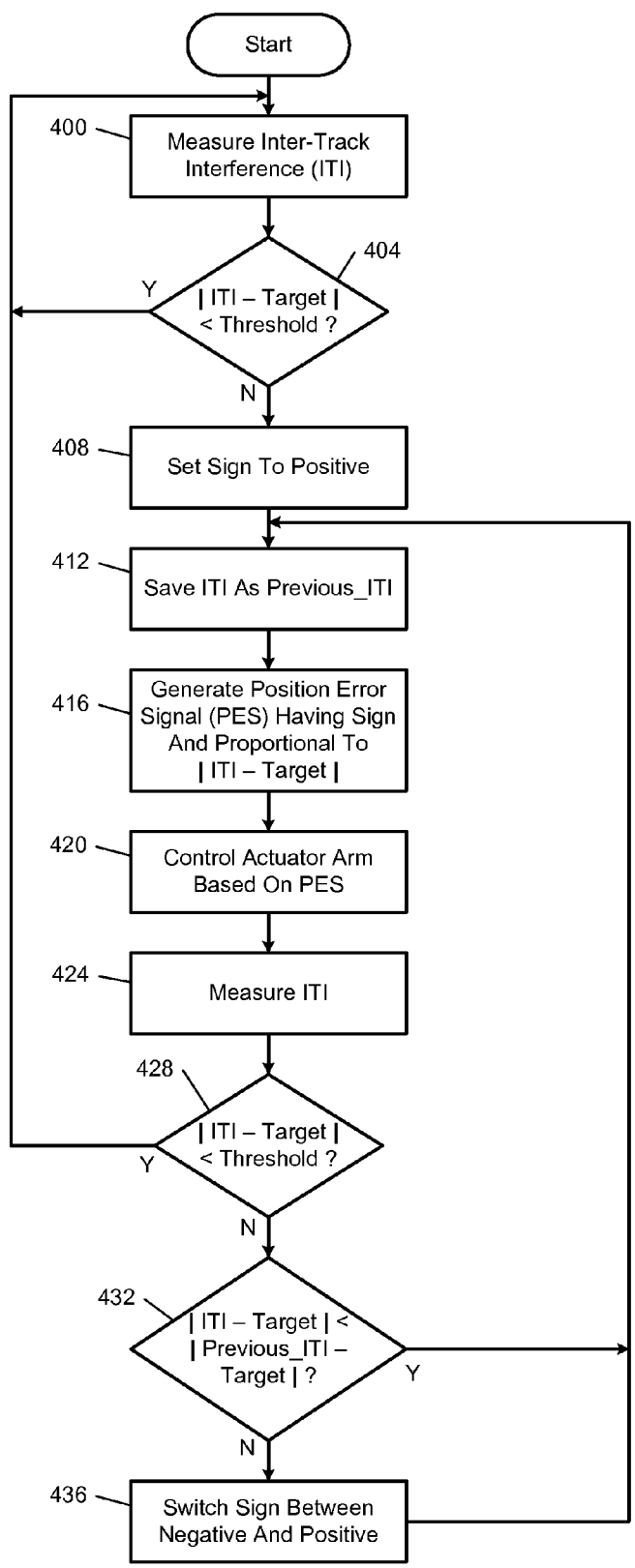
FIG. 8 is a flowchart of example operation of a read process that can be used with a single-sensor read head.

In FIG. 8, example operation of portions of a read process, which may be implemented by the HDD system 200 of FIG. 5, begins at 400 where inter-track interference is measured. At 404, control determines whether the absolute value of the difference between the measured inter-track interference and a target inter-track interference is less than a threshold. If so, control returns to 400; otherwise, if the difference is greater than or equal to the threshold, control transfers to 408.

At 408, control may not yet know in which direction the read head has drifted and therefore the sign of a position error signal is set to an arbitrary state (in this implementation, positive) on a trial basis. At 412, control saves the measured inter-track interference as a value named Previous_ITI.

At 416, control generates a position error signal having the established sign and having a magnitude proportional to the absolute value of the difference between the measured inter-track interference and the target inter-track interference. At 420, control adjusts an angle of the actuator arm 22 to address the position error signal. At 424, control measures inter-track interference. At 428, if the absolute value of the difference between the measured inter-track interference and the target inter-track interference is now less than the threshold, control returns to 400; otherwise, control transfers to 432.

At 432, control determines whether the absolute value of the difference between the measured inter-track interference and the target inter-track interference has decreased when compared to the absolute value of the Previous_ITI value and the target inter-track interference value. If the current difference is less than the previous difference, control assumes that the sign of the position error signal was set correctly and control returns to 412; otherwise, control transfers to 436. At 436, because the difference between the measured inter-track interference and the target inter-track interference did not diminish, control switches the sign of the position error signal to the opposite of the existing sign. Control then returns to 412.

Control may repeat the process of FIG. 8 as long as a read is occurring, and may also execute the process of FIG. 8 to determine position at various stages during writing. In various implementations, the inter-track interference is measured while the read head is located over a preamble sequence. Additionally or alternatively, the inter-track interference may be measured while the read head is over other types of data, such as user data.

Figure 9:
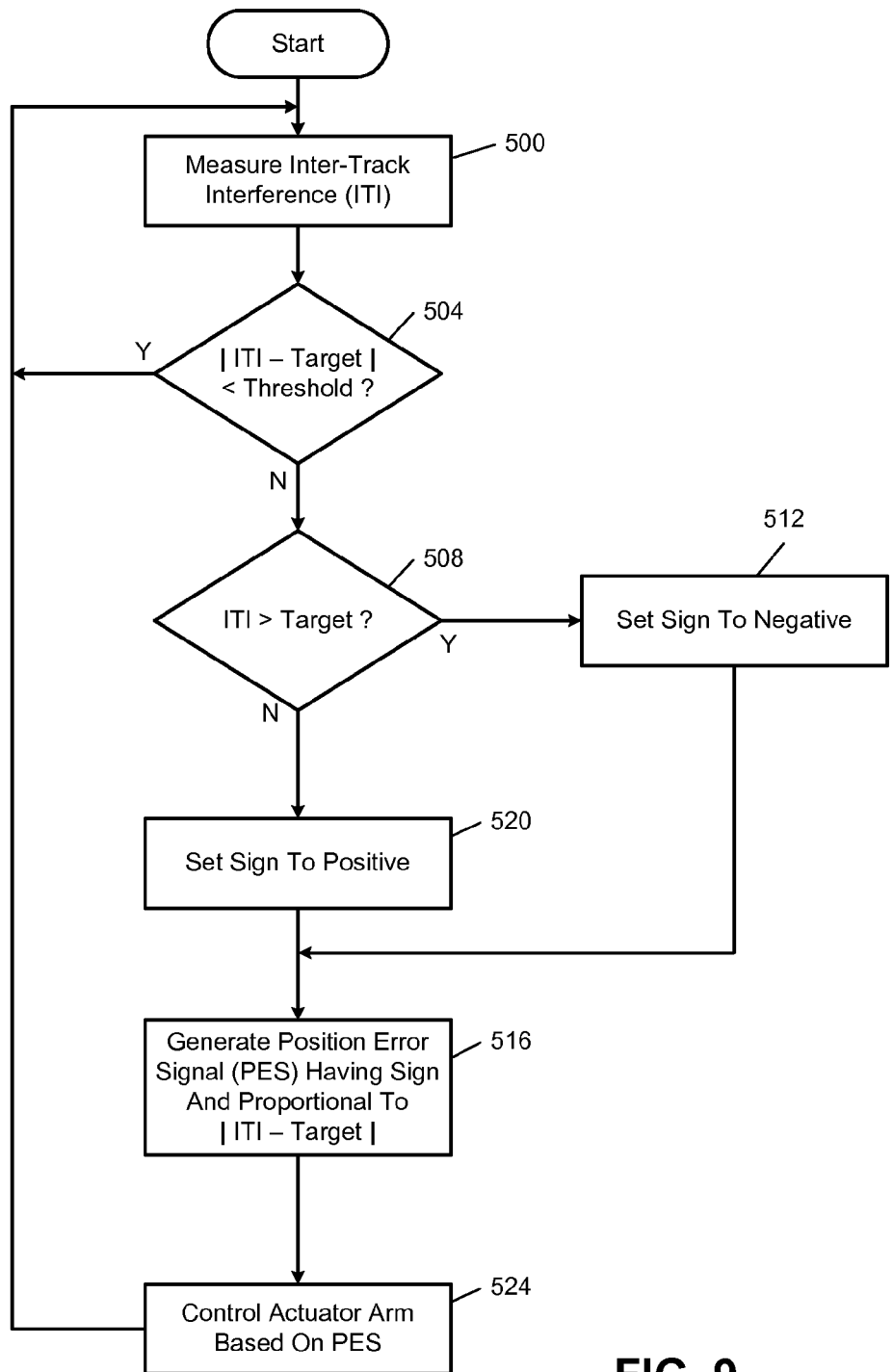
FIG. 9 is a flowchart of another example operation that can be used with a single-sensor read head.

In FIG. 9, control begins at 500 where inter-track interference is measured. Control continues at 504 where if the absolute value of the difference between the measured inter-track interference and the target inter-track interference is less than a predetermined threshold, control returns to 500; otherwise, control transfers to 508. At 508, control determines whether the measured inter-track interference is greater than the target inter-track interference. If so, control transfers to 512 where the sign of a position error signal is set to negative and control continues at 516.

If at 508 the measured inter-track interference was less than the target inter-track interference, control transfers to 520 where the sign of the position error signal is set to positive and control then continues at 516. Such control may be used in situations such as those shown in FIG. 6C where a single read signal is present and the read head is offset from being centered around the desired track. Therefore, a decrease of the inter-track interference below the target is an indication that the read head is drifting away from the desired position.

The sign of the position error signal in 512 and 520 may be reversed depending on how the position error signal is interpreted, and depending on in which direction, with respect to the track, the read sensor is biased. At 516, control generates a position error signal having the determined sign and being proportional to the difference between the measured inter-track interference and the target inter-track interference. At 524, control adjusts the voice coil motor to rotate the actuator arm 22 to bring the read head in proper alignment with the track.

Figure 10:
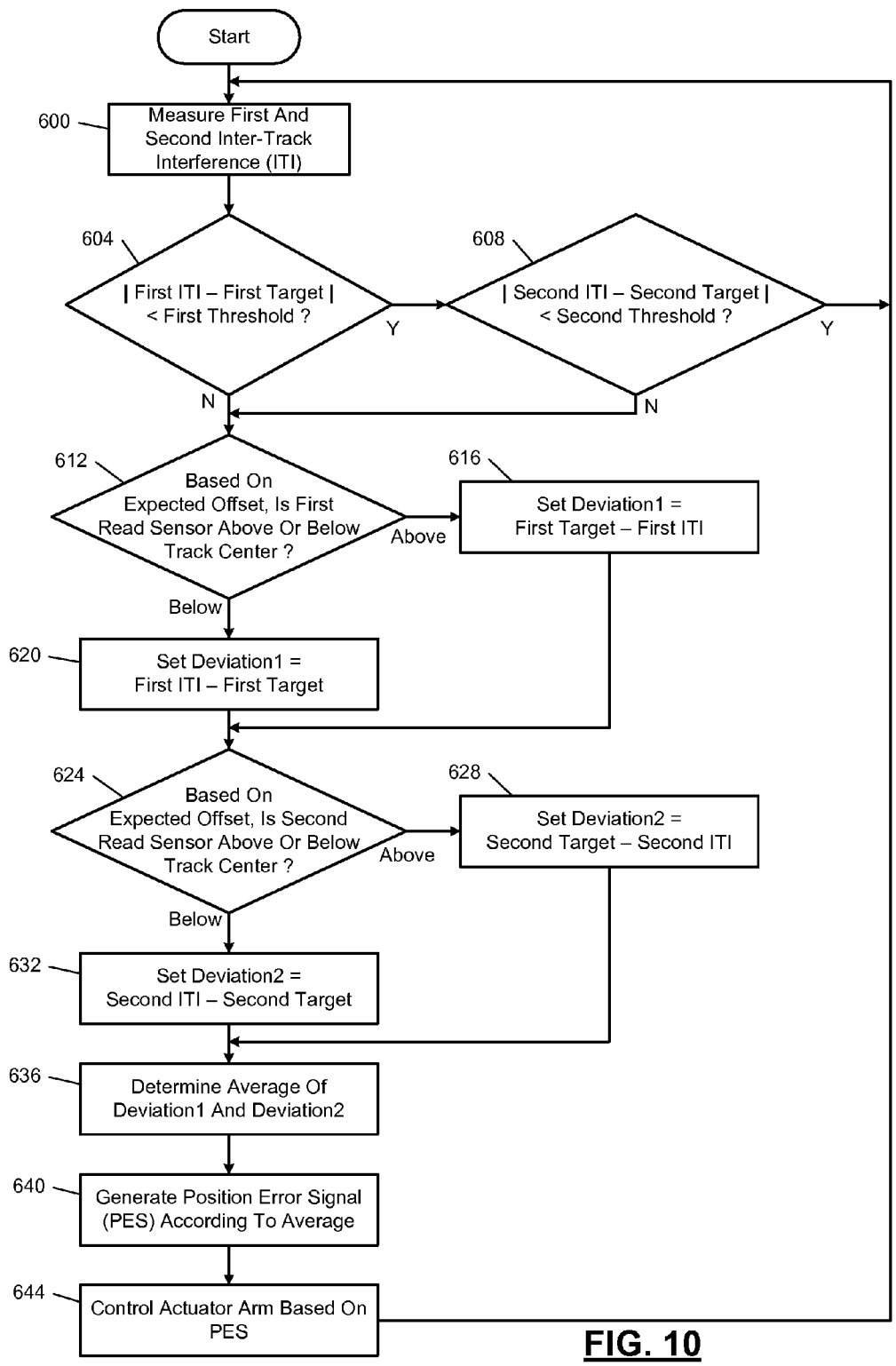
FIG. 10 is a flowchart of example operation of a read process for use with a two-sensor read head.

In FIG. 10, control for a multi-sensor implementation begins at 600 where first and second inter-track interference values are measured. Control continues at 604 where if an absolute value of the difference between a first inter-track interference and a first target is less than a first threshold, control continues at 608; otherwise, control transfers to 612.

At 608, if an absolute value of the difference between a second inter-track interference and a second target is less than a second threshold, control returns to 600; otherwise, control transfers to 612. In various implementations, the first threshold and the second threshold may be equal. The first target inter-track interference and the second target inter-track interference may be adjusted based on the specified offset from the offset calibration module 328 of FIG. 7A.

At 612, control determines whether, based on the expected offsets, the first read sensor is above or below the center of the track being read. If above, control transfers to 616; otherwise, control transfers to 620. At 616, the first read sensor should be above the track center. Therefore, if the first read sensor moves down with respect to the track center, the first read sensor will be more closely aligned with the track center and the inter-track interference would decrease. This movement may be considered a positive deviation (in the direction of track n+1 instead of in the direction of track n−1). At 616, therefore, a variable Deviation' is set equal to a positive number: the difference between the first target inter-track interference and the first measured inter-track interference.

Similarly, if the first read sensor moves up with respect to the track center, the inter-track interference would increase. Then, the difference between the first target inter-track interference and the first measured inter-track interference would be negative, and Deviation' would be a negative number, indicating a shift of the first read sensor upward. Control then continues at 624.

At 620, the expected position of the first read sensor is below the track center. The Deviation' variable is set equal to the difference between the first measured inter-track interference and the first target inter-track interference. An upward drift of the first read sensor decreases inter-track interference, resulting in a negative value, correctly indicating that the first read sensor is drifting in a negative direction (that is, toward track n−1 as opposed to toward track n+1). Control then continues at 624.

At 624, control determines whether, based on the expected offsets, the second read sensor is above or below the center of the track being read. If above, control transfers to 628; otherwise, control transfers to 632. At 628, a variable Deviation2 is set equal to the difference between the second target inter-track interference and the second measured inter-track interference and control continues at 636. At 632, the Deviation2 variable is set equal to the difference between the second measured inter-track interference and the second target inter-track interference and control continues at 636.

At 636, control determines an average of Deviation' and Deviation2. At 640, control generates the position error signal according to the average. At 644, control uses the position error signal to determine how to control the actuator arm and adjust the location of the head over the platters. Control then returns to 600.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A hard disk drive circuit comprising:
   a first inter-track interference detection module configured to generate a first measured inter-track interference value based on a first read signal from a first read sensor positioned over a first track of a magnetic medium, wherein the first measured inter-track interference value indicates an amount of energy contributed to the first read signal by tracks adjacent to the first track compared to an amount of energy contributed to the first read signal by the first track;
   a second inter-track interference detection module configured to generate a second measured inter-track interference value based on a second read signal from a second read sensor positioned over a second track of the magnetic medium, wherein the second measured inter-track interference value indicates an amount of energy contributed to the second read signal by tracks adjacent to the second track compared to an amount of energy contributed to the second read signal by the second track;
   a position error signal generation module configured to generate a position error signal based on the first measured inter-track interference value and the second measured inter-track interference value; and
   an arm control module configured to control rotation of an arm in response to the position error signal, wherein the first read sensor and the second read sensor are located at a distal end of the arm.

2. A hard disk drive system comprising:
   the hard disk drive circuit of claim 1; and
   a hard disk assembly comprising a read head, wherein the read head includes the first read sensor and the second read sensor.

3. The hard disk drive system of claim 2, further comprising a voice coil motor configured to rotate the arm in response to the arm control module.

4. The hard disk drive circuit of claim 1, wherein:
   the first inter-track interference detection module is configured to generate the first measured inter-track interference value while the first read sensor is positioned over first preamble data; and
   the second inter-track interference detection module is configured to generate the second measured inter-track interference value while the second read sensor is positioned over second preamble data.

5. The hard disk drive circuit of claim 4, wherein alternating tracks of the magnetic medium include orthogonal preambles.

6. The hard disk drive circuit of claim 1, further comprising:
an inter-track interference cancellation module configured to generate a read signal based on the first read signal and the second read signal; and
a delay module configured to delay the second read signal, wherein the inter-track interference cancellation module operates using the delayed second read signal instead of the second read signal.

7. The hard disk drive circuit of claim 1, further comprising a third inter-track interference detection module configured to generate a third measured inter-track interference value based on a third read signal from a third read sensor positioned over the magnetic medium, wherein the position error signal generation module is configured to generate the position error signal based on the first measured inter-track interference value, the second measured inter-track interference value, and the third measured inter-track interference value.

8. The hard disk drive circuit of claim 1 wherein:
while the first read sensor and the second read sensor are positioned over a first portion of the magnetic medium, the first track and the second track both refer to a same track; and
while the first read sensor and the second read sensor are positioned over a second portion of the magnetic medium, the first track and the second track refer to adjacent tracks.

9. A hard disk drive circuit comprising:
a first inter-track interference detection module configured to generate a first measured inter-track interference value based on a first read signal from a first read sensor positioned over a magnetic medium;
a second inter-track interference detection module configured to generate a second measured inter-track interference value based on a second read signal from a second read sensor positioned over the magnetic medium;
a position error signal generation module configured to generate a position error signal based on the first measured inter-track interference value and the second measured inter-track interference value; and
an arm control module configured to control rotation of an arm in response to the position error signal, wherein the first read sensor and the second read sensor are located at a distal end of the arm,
wherein the position error signal generation module is configured to generate the position error signal based on (i) a first difference between the first measured inter-track interference value and a first target inter-track interference value and (ii) a second difference between the second measured inter-track interference value and a second target inter-track interference value.

10. The hard disk drive circuit of claim 9, wherein the position error signal generation module is configured to generate the position error signal based on an average of the first difference and the second difference.

11. The hard disk drive circuit of claim 9, further comprising an offset calibration module configured to specify the first target inter-track interference value and the second target inter-track interference value in response to a number, wherein the number identifies which track of the magnetic medium is being read by the hard disk drive circuit.

12. A hard disk drive circuit comprising:
a first inter-track interference detection module configured to generate a first measured inter-track interference value based on a first read signal from a first read sensor positioned over a magnetic medium;
a second inter-track interference detection module configured to generate a second measured inter-track interference value based on a second read signal from a second read sensor positioned over the magnetic medium;
a position error signal generation module configured to generate a position error signal based on the first measured inter-track interference value and the second measured inter-track interference value;
an arm control module configured to control rotation of an arm in response to the position error signal, wherein the first read sensor and the second read sensor are located at a distal end of the arm; and
an offset calibration module configured to specify an offset between the first read sensor and the second read sensor in response to a number, wherein the number identifies which track of the magnetic medium is being read by the hard disk drive circuit.

13. The hard disk drive circuit of claim 12, wherein the position error signal generation module is configured to determine a sign of the position error signal based on the offset.

14. A method of operating a hard disk drive circuit, the method comprising:
generating a first measured inter-track interference value based on a first read signal from a first read sensor positioned over a first track of a magnetic medium, wherein the first measured inter-track interference value indicates an amount of energy contributed to the first read signal by tracks adjacent to the first track compared to an amount of energy contributed to the first read signal by the first track;
generating a second measured inter-track interference value based on a second read signal from a second read sensor positioned over a second track of the magnetic medium, wherein the second measured inter-track interference value indicates an amount of energy contributed to the second read signal by tracks adjacent to the second track compared to an amount of energy contributed to the second read signal by the second track;
generating a position error signal based on the first measured inter-track interference value and the second measured inter-track interference value; and
controlling rotation of an arm in response to the position error signal, wherein the first read sensor and the second read sensor are located at a distal end of the arm.

15. The method of claim 14, wherein:
the generating the first measured inter-track interference value is performed while the first read sensor is positioned over first preamble data; and
the generating the second measured inter-track interference value is performed while the second read sensor is positioned over second preamble data.

16. The method of claim 15, wherein alternating tracks of the magnetic medium include orthogonal preambles.

17. The method of claim 14 wherein:
while the first read sensor and the second read sensor are positioned over a first portion of the magnetic medium, the first track and the second track both refer to a same track; and
while the first read sensor and the second read sensor are positioned over a second portion of the magnetic medium, the first track and the second track refer to adjacent tracks.

18. A method of operating a hard disk drive circuit, the method comprising:

generating a first measured inter-track interference value based on a first read signal from a first read sensor positioned over a magnetic medium;

generating a second measured inter-track interference value based on a second read signal from a second read sensor positioned over the magnetic medium;

generating a position error signal based on the first measured inter-track interference value and the second measured inter-track interference value; and controlling rotation of an arm in response to the position error signal, wherein the first read sensor and the second read sensor are located at a distal end of the arm, wherein the position error signal is generated based on (i) a first difference between the first measured inter-track interference value and a first target inter-track interference value and (ii) a second difference between the second measured inter-track interference value and a second target inter-track interference value.

19. The method of claim 18, wherein the position error signal is generated based on an average of the first difference and the second difference.

20. The method of claim 18, further comprising specifying the first target inter-track interference value and the second target inter-track interference value in response to a number, wherein the number identifies which track of the magnetic medium is being read by the hard disk drive circuit.

21. A method of operating a hard disk drive circuit, the method comprising:

generating a first measured inter-track interference value based on a first read signal from a first read sensor positioned over a magnetic medium;

generating a second measured inter-track interference value based on a second read signal from a second read sensor positioned over the magnetic medium;

generating a position error signal based on the first measured inter-track interference value and the second measured inter-track interference value;

controlling rotation of an arm in response to the position error signal, wherein the first read sensor and the second read sensor are located at a distal end of the arm; and specifying an offset between the first read sensor and the second read sensor in response to a number, wherein the number identifies which track of the magnetic medium is being read by the hard disk drive circuit.

22. The method of claim 21, further comprising determining a sign of the position error signal based on the offset.

\* \* \* \* \*